May 20, 1958    J. A. BEEK, JR., ET AL    2,835,882
MAGNETIZABLE RECORD READING SYSTEM
Filed Jan. 27, 1955    2 Sheets-Sheet 1
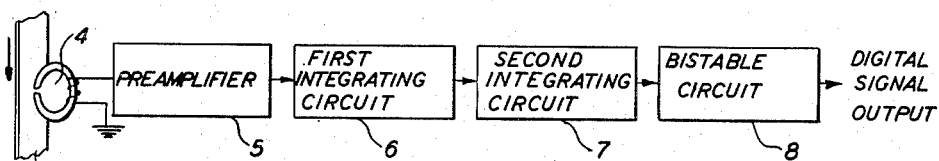
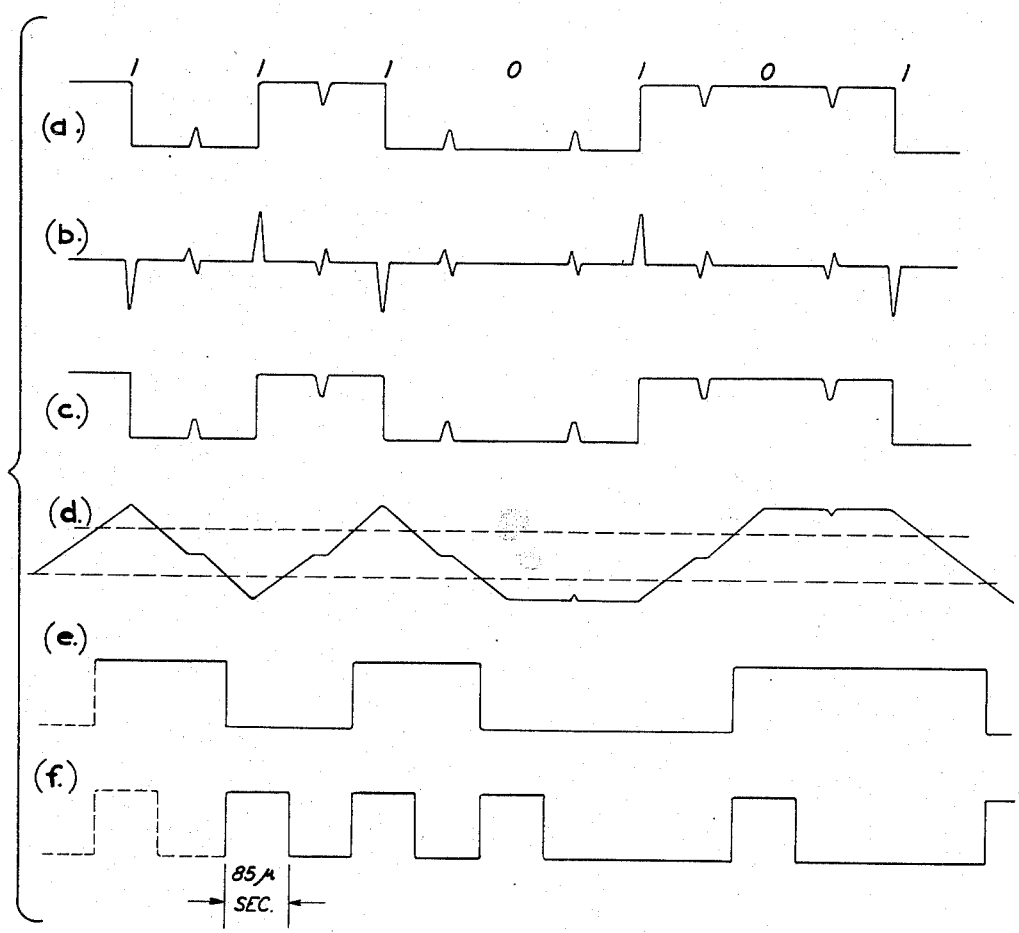
INVENTORS
JOSEPH ALLAN BEEK, JR.
PAUL R. GILSON
PHILIP R. WESTLAKE
BY
Christie, Parker & Hale
ATTORNEYS May 20, 1958 J. A. BEEK, JR., ET AL 2,835,882
MAGNETIZABLE RECORD READING SYSTEM
Filed Jan. 27, 1955 2 Sheets-Sheet 2

INVENTORS
JOSEPH ALLAN BEEK, JR.
PAUL R. GILSON
BY PHILIP R. WESTLAKE

Christie, Parker & Hale
ATTORNEYS

United States Patent Office 2,835,882
Patented May 20, 1958

2,835,882

MAGNETIZABLE RECORD READING SYSTEM

Joseph Allan Beek, Jr., Pasadena, Paul R. Gilson, West Covina, and Philip R. Westlake, Pasadena, Calif., assignors, by mesne assignments, to Burroughs Corporation, Detroit, Mich., a corporation of Michigan Application January 27, 1955, Serial No. 484,404

8 Claims. (Cl. 340—174)

This invention relates to magnetizable record reading systems, and more particularly, to an improved method and apparatus for deriving electrical signals corresponding to magnetically recorded digital signals.

In data processing systems, it is well known to store digital signals in binary code on a magnetizable record by varying the condition of magnetization of the record between two discrete levels. In some types of systems the degree of magnetization represents the digital value, while in other types of systems the change of the degree of magnetization from one level to another represents the digital value.

One problem encountered in magnetic recording systems used for storing digital signals is that extraneous signals, e. g. noise, sometimes appear interspersed and mixed with the digital signals. When a magnetizable record has been used a great number of times, the extraneous signals become quite great and produce erroneous indications as to the digital values recorded.

In accordance with the present invention, an improved method and apparatus for deriving electrical signals corresponding to digital signals recorded on a magnetizable record are provided in which digital signals may be separated from extraneous signals. Briefly, the invention contemplates the derivation of an electrical signal corresponding to the changes in degree of magnetization of a magnetizable record, integrating the derived signal to provide a wave corresponding to the magnetization of the magnetizable record, integrating or filtering the last named wave to provide an amplitude limited wave which is more or less triangular in form, and generating an output signal in accordance with the triangular wave which is of one value when the value of the triangular wave exceeds a first predetermined limit, and generating an output signal of a second value when the triangular wave has a value less than a second predetermined limit lower than the first predetermined limit.

As a result, the output signal faithfully represents the variation of magnetization of the magnetizable record, corresponding to information signals only. Thus, the extraneous signals are effectively removed from the output signal.

In one embodiment of the invention a magnetizable record is passed adjacent a transducer so that the output signal from the transducer is an electrical signal corresponding to the derivative of the magnitization of the record. A first integrating circuit coupled to the transducer generates an amplitude limited wave corresponding to the integral of the differential wave. A second integrating circuit coupled to the first integrating circuit generates an amplitude limited triangular wave corresponding to the amplitude limited integral of the wave from the first integrating circuit. A bi-stable circuit is coupled to the second integrating circuit with the bi-stable circuit having a first condition of operation which is induced when the triangular wave is greater in amplitude than a first predetermined limit and having a second condition of operation which is induced when the triangular wave has an amplitude less than a second predetermined value.

For a better understanding of the invention, reference is made to the following detailed description which should be taken in conjunction with the drawings, in which:

Fig. 1 is a block diagram of an illustrative embodiment of the invention for reading magnetizable records;

Fig. 2 is a set of graphical illustrations showing certain electrical signals and waves appearing in the embodiment of Fig. 1.

Figure 3:
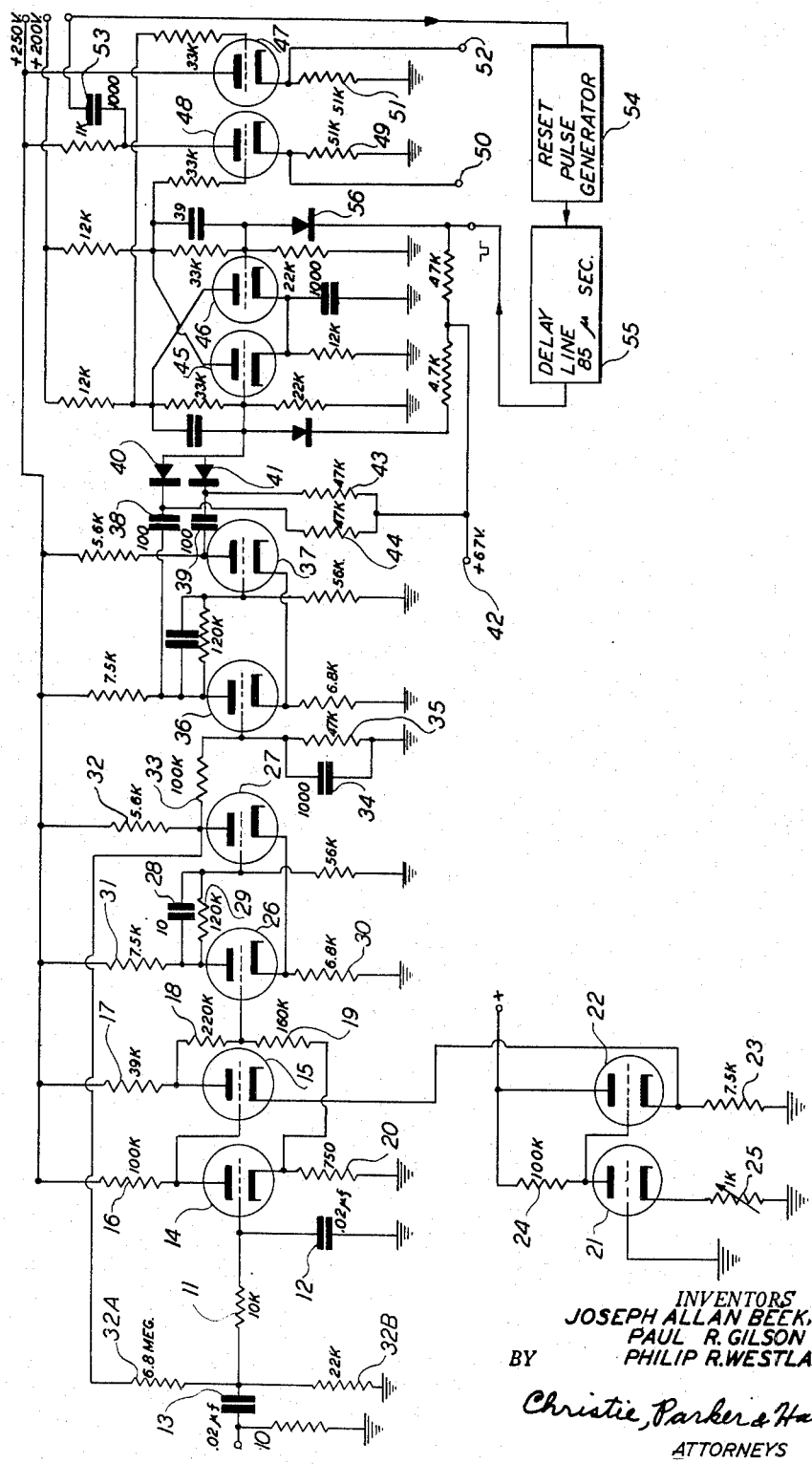
Fig. 3 is a schematic circuit diagram showing one type of apparatus for use in the embodiment of Fig. 1.

In Fig. 1, a magnetizable record 3, having varying degrees of magnetization corresponding to digital signals, may be transported past a transducer 4 by a suitable transport mechanism (not shown). Some of the types of magnetizable records which may be used in connection with the system of Fig. 1 include tapes, drums or disks upon which is deposited a magnetizable coating.

As is well known, the transducer 4 effectively functions as a differentiator with respect to the actual flux pattern recorded on the magnetizable record 3. Thus, a square wave recorded on the magnetizable record 3 induces a series of alternate positive going and negative going signals in the windings of the transducer 4. These signals are amplified in a preamplifier 5 and then applied to a first integrating circuit 6.

Where the actual flux pattern on the magnetizable record 3 resembles that shown in Fig. 2(a), the resultant output signals from the preamplifier 5 are as shown in Fig. 2(b). It will be noted that between the relatively large abrupt flux changes in Fig. 2(a) there appear smaller extraneous noise changes which are differentiated in the same manner as the large flux changes and appear as shown in Fig. 2(b).

The first integrating circuit is adapted to generate a square wave in response to the wave of Fig. 2(b). Thus, the wave provided by the first integrating circuit corresponds closely to the actual flux pattern appearing on the magnetizable record 3 and is as shown in Fig. 2(c).

Coupled to the first integrating circuit 6 is a second integrating circuit 7. This circuit functions to integrate the wave of Fig. 2(c) to provide an amplitude limited triangular or sawtooth wave as shown in Fig. 2(d). It will be noted that the extraneous noise pulses cause only a small variation in the triangular wave of Fig. 2(d).

The triangular wave is then applied to a threshold device, such as for example, the bi-stable circuit 8. The bi-stable circuit 8 is adapted to respond to the instantaneous amplitude of the triangular wave of Fig. 2(d). Thus, when the triangular wave exceeds a predetermined value, the bi-stable circuit 8 is placed in one condition of operation. In contrast, when the triangular wave has a value less than a second predetermined value lower than the first predetermined value, the bi-stable circuit assumes a second condition of operation.

The signal appearing at the output of the bi-stable circuit 8 is as shown in Fig. 2(e). Since the parts of the triangular wave between the predetermined values at which the bi-stable circuit 8 is actuated are not passed to the output circuit, the wave of Fig. 2(e) does not include the extraneous signals. Consequently, the output wave represents the information signals only.

As indicated in Fig. 2, the flux changes between the two discrete levels may be coded to represent the value of digital signals. The indicated system of coding makes every flux change correspond to one binary digit value. Thus, every time the flux density changes from one level to another, a binary "1" may be presented. In the absence of any flux change a binary "0" is represented. However, other types of coding may be used as well. A discussion of various types of coding for digital recording may be found at page 322 et seq. of "High Speed Computing Devices" by the staff of Engineering Research Associates, published in 1950 by the McGraw-Hill Book Company, Inc. of New York.

The apparatus shown in Fig. 3 may be used to perform the functions of the first integrating circuit 6, the second integrating circuit 7, and the bi-stable circuit 8 of Fig. 1. In Fig. 3 an input signal derived from a magnetic reading transducer, and amplified by a suitable preamplifier (not shown), may be applied to a terminal 10. The signal applied to the terminal 10 is coupled to the first integrating circuit comprising a resistor 11 and a capacitor 12, via the coupling capacitor 13. The integrated wave appearing across the capacitor 12 is amplified by a constant gain two-stage D. C. amplifier, which includes a first amplifying electron tube 14 and a second amplifying electron tube 15. Conventional load resistors 16 and 17 are connected between the anodes of the electron tubes 14 and 15 and a suitable source of positive potential (not shown).

The signal appearing at the anode of the amplifying electron tube 15 is coupled back to the cathode of the amplifying electron tube 14 via the voltage dividing resistors 18 and 19. This voltage appears across the cathode resistor 20 associated with the amplifying electron tube 14.

In effect, the application of the signal appearing at the anode of the electron tube 15 to the cathode of the amplifying electron tube 14 is negative feedback by means of which there is obtained substantial gain stability of the amplifiers, which makes the amplification of the signal relatively independent of the aging of the electron tubes.

For additional gain stability there is provided a filament compensation circuit including the electron tubes 21 and 22. It will be noted that a common cathode resistor 23 is shared by the electron tube 22 and the electron tube 15. By varying the control grid potential on the electron tube 22, the current flowing through the cathode resistor 23 may be varied, and hence the biasing of the electron tube 15 is varied. As shown, the control grid of the electron tube 21 is held at ground reference potential, the anode of the electron tube 21 is supplied with positive operating potential via a suitable load resistor 24, and a variable cathode resistor 25 provides means for controlling the flow of current through the electron tube 21.

In operation, the filament compensation circuit is arranged so that electron tubes 14 and 21 are identical in type and age, in the same envelope if possible. Since these tubes are used in circuits having equal gain, any change in the characteristics of one will be duplicated by the other and will be reflected to the grid and cathode of 15 in equal amounts and hence cancel. In like manner 15 is compensated by 22. Consequently, the overall gain of the electron tubes 14 and 15 is held at a constant value without being substantially affected by the aging of the electron tubes or changes in heater applied voltage.

In one workable embodiment, the voltage appearing across the integrating capacitor 12 varied between .57 volt and .77 volt, and the D. C. amplifying electron tubes 14 and 15 were arranged to have an overall gain of 100, so that the voltage appearing at the junction point of the resistors 18 and 19 varied between 57 volts and 77 volts. The voltage appearing at the junction point between the resistors 18 and 19 is applied to a conventional Schmidt trigger circuit, including an electron tube 26 and an electron tube 27. The circuit is arranged to have two stable conditions. In the case where the potential at the junction between the resistors 18 and 19 varied between 57 volts and 77 volts, it has been found satisfactory to arrange the Schmidt trigger circuit to assume one condition of operation when the voltage exceeds one predetermined value of approximately 72 volts, and to assume another condition of operation when the voltage is less than a second predetermined value of approximately 62 volts.

In operation, assuming the electron tube 26 is conducting, and the electron tube 27 is cut-off, a decrease in potential below the second predetermined value of 62 volts causes the anode of the electron tube 26 to go positive, and this positive excursion is coupled to the control electrode of the electron tube 27 via a coupling capacitor 28 and a resistor 29. The resultant increase in current flowing through the electron tube 27 decreases the potential between the control electrode and cathode of the electron tube 26 due to the increased voltage drop across the common cathode resistor 30. This has a cumulative effect which tends to cut off the electron tube 26. The action continues until the electron tube 26 is completely cut off and the electron tube 27 is conducting.

In like manner, when the voltage at the junction between the resistors 18 and 19 rises above the first predetermined value of 72 volts, the electron tube 26 is rendered conducting. The voltage at the anode of the electron tube 26 drops and the drop in potential is coupled to the control electrode of the electron tube 27 which tends to reduce conduction therein. Of course it will be appreciated that in order for the variation in the current through the cathode resistor to be sufficiently regenerative, the value of the load resistor 31 should be larger than the value of the load resistor 32 connected to the anode of the electron tube 27.

Appearing at the anode of the electron tube 27 is a wave which substantially corresponds to the actual flux pattern appearing on a magnetizable record member from which the wave applied to the terminal 10 is a derivative. However, the wave appearing at the anode of the electron tube 27 has been amplitude limited so that the voltage varies between two discrete levels, i. e. 176 volts and 241 volts. The wave appearing at the anode of the electron tube 27 may be fed back and applied to the first integrating circuit comprising the resistor 11 and the capacitor 12. This feedback maintains the charge on the capacitor 12 at a first level in accordance with the condition of conduction of the electron tube 27. This effectively holds the wave appearing across the capacitor 12 at either the .57 volt or the .77 volt level. The value of the voltage fed back to the first integrating circuit, and hence the holding level, is determined by the relative values of the voltage divider resistors 32A and 32B.

The wave appearing at the anode of the electron tube 27 is coupled to the second integrating circuit which comprises the resistor 33, the capacitor 34 and a resistor 35. The wave appearing across the parallel combination of the capacitor 34 and the resistor 35 is a substantially triangular wave corresponding roughly to the integral of the wave appearing at the anode of the electron tube 27.

If the type of recording system is used in which the absence of a change in condition of magnetization of the magnetizable record indicates a digital value, the wave appearing across the capacitor 34 will increase to 77 volts, or decrease to 57 volts. The second integrating circuit discriminates against extraneous signals which are of relatively short duration, since such extraneous signals have little effect upon the voltage appearing across the capacitor 34.

The electron tubes 36 and 37 are connected in a Schmidt trigger circuit similar to that including the electron tubes 26 and 27 so that when the voltage at the control electrode of the electron tube 36 rises above 72 volts, the electron tube 36 will be rendered conducting, while the electron tube 37 will be rendered cut-off. Likewise, when the voltage appearing across the capacitor 34 decreases below a second predetermined value of 62 volts, the electron tube 36 will be cut off and the electron tube 37 will be rendered conducting.

When the conditions of conduction of the electron tubes 36 and 37 are reversed, an impulse is passed by each of the capacitors 38 and 39 to the diodes 40 and 41. The diodes are connected to the grid of tube 45 in such a manner that they will pass only negative pulses and only when this grid is high. The electron tubes 45 and 46 are cross-coupled in conventional fashion so that when a negative pulse is passed by either the diode 40 or the diode 41, the electron tube 45 is rendered cut-off, while the electron tube 46 is rendered conducting.

Connected to the anode of the electron tube 46 is a cathode follower electron tube 47, and in like manner, connected to the anode of the electron tube 45 is a cathode follower electron tube 48. The output signal appearing across the cathode resistor 49 associated with the electron tube 48 represents the condition of conduction of the electron tube 45, and may be taken from a terminal 50. Likewise, the voltage appearing across a cathode resistor 51 associated with the electron tube 47 represents the condition of conduction of the electron tube 45, and this signal may be taken from an output terminal 52.

It will be appreciated that the voltages appearing at the output terminals 50 and 52 will be out of phase and will be of two discrete levels when a change in flux has passed under the transducer and a consequent electrical impulse is applied to the terminal 10. Ordinarily, the bi-stable circuit of the electron tubes 45 and 46 is maintained in the stable state in which the right-hand electron tube 46 is maintained cut-off, while the left-hand electron tube 45 is conducting. However, whenever a flux change occurs, the left-hand electron tube 45 is cut off and the right-hand electron tube 46 is rendered conducting. Consequently, after a flux change the voltage appearing at the terminal 50 will be relatively high and the voltage appearing at the terminal 52 will be relatively low.

The circuit is automatically reset by deriving an impulse from the anode of the electron tube 48 by a capacitor 53 which is applied to a reset pulse generator 54. The output signal from the reset pulse generator is delayed in time by a suitable amount, such as 85 microseconds, by means of a delay line 55, or equivalent, and then is applied to the control electrode of the right-hand electron tube 46 via the diode 56.

Therefore, in overall operation the apparatus shown in Fig. 3 functions to receive a differentiated wave at the terminal 10, which represents the derivative of the flux changes on a magnetizable record member. In response to the differentiated wave, which may include extraneous signals as well as information signals, the circuit functions to provide a first integration of the wave which is amplitude limited, an amplitude limited second integration or filtering of the wave which substantially reduces the effect of any extraneous signals, and provides output signals in accordance with the information signals only as shown in Fig. 2(f). These output signals may be applied to any type of digital recording or computing equipment, etc. from which may be expected reliable operation in accordance with the information signals, without the difficulties normally encountered from extraneous signals which appear along with the information signals in conventional magnetizable record reading circuits.

As shown, the circuitry of Fig. 3 is arranged so that the condition of operation of the bi-stable circuit represents the digital value in the type of magnetic recording system in which a flux change indicates a digital value, and the absence of a flux change indicates another digital value. However, the circuit may be easily modified for use with other types of digital recording systems. For example, where the absolute flux density indicates the digital value, as where two discrete levels each represent a single binary digit value, the output from the anodes of Schmidt trigger electron tubes 36 and 37 may be applied to opposite sides of the bi-stable circuit of the electron tubes 45 and 46. Thus, the output of the diode 41 may be coupled to the control electrode of the electron tube 45, while the diode 40 may be coupled to the control electrode of the electron tube 46. If this is done, the condition of operation of the bi-stable circuit of the electron tubes 45 and 46 alternates with every other flux change, and consequently, the condition of operation as represented by the signals appearing at the terminals 50 and 52 will represent the actual binary digits. One of these output signals is shown in Fig. 2(e). With this type of recording system there is no need to reset the bi-stable circuit of the electron tubes 45 and 46, and consequently, the reset pulse generator 54 and the delay line 55 may be omitted.

In explaining the operation of the illustrative embodiments of the invention shown in Figs. 1 and 3, various portions of the circuitry have been referred to as integrating circuits and the function performed by these circuits has been termed "integration." This type of circuit is believed to be well known to those skilled in the art. However, it is intended that throughout the specification and claims whenever the word "integrating" is used it shall be understood to include the word "filtering," and in like manner, wherever a portion is labeled "integrating circuit" it shall be understood to include a filter circuit adapted to perform a similar function.

Although the values of the components of the schematic circuit diagram of Fig. 3 are given, it will be appreciated that these values are by way of example only, being indicative of those employed in one workable embodiment. The values of the resistors are given in ohms where K=1000 and meg.=1,000,000, the values of the potentials are given in volts (v.) and the values of the capacitors are given in microfarads ($\mu$fd.) where the number given is less than one and are given in micromicrofarads ($\mu\mu$fd.) where the number given is greater than one.

We claim:

1. Apparatus for reading information from a magnetizable record bearing digital signals, including in combination a transducer; means moving the magnetizable record relative to the transducer; a first integrating circuit coupled to the transducer for providing a rectangular wave; a second integrating circuit coupled to the first integrating circuit for providing a triangular wave in response to the rectangular waves; and a circuit coupled to the second integrating circuit, having a first condition of operation which represents one digital value and a second condition of operation which represents a second digital value; and means coupled between the second integrating circuit and said last-named circuit for inducing the last-named circuit to assume a condition of operation corresponding to a recorded digital signal when the triangular wave has a predetermined value.

2. Apparatus in accordance with claim 1, including means coupled between the first integrating circuit and the second integrating circuit for holding the square wave at either one of two predetermined values.

3. Apparatus for reading digital signals from a magnetizable record on which information is represented by changes in flux density between two predetermined levels; means generating an electrical signal train having alternate positive and negative going impulses corresponding to the changes in flux density of said magnetizable record; a first integrating circuit coupled to said signal train generating means for providing a first electrical wave corresponding to the integral of the signal train; a second integrating circuit coupled to the first integrating circuit for providing a second electrical wave corresponding to the integral of said first electrical wave; and a bi-stable circuit coupled to said second integrating circuit which is adapted to provide an output signal of a first value when the second electrical wave exceeds a first predetermined value, and for providing a signal of a second value when the value of the second electrical wave is less than a second predetermined value lower than said first predetermined value.

4. Apparatus in accordance with claim 3, including means coupled between the first integrating circuit and the second integrating circuit for holding the first electrical wave at one predetermined value in response to one given change in flux density of said magnetizable record and at another predetermined value in response to another given change in flux density of said magnetizable record.

5. A reading amplifier for use in conjunction with a magnetic recording system, including in combination an input terminal, a first integrating circuit coupled to the input terminal, a second integrating circuit coupled to the output of the first integrating circuit, a bi-stable device coupled to the output of the second integrating circuit, and an output terminal coupled to the said bi-stable circuit whereby signals appear at the output terminal representing information bearing signals applied to the input terminal only.

6. A reading amplifier for use in conjunction with a magnetic recording system for distinguishing between information bearing signals and extraneous signals, including in combination an input terminal, means generating a rectangular wave in response to signals appearing at said input terminal; an integrating circuit coupled to said rectangular wave generating circuit for providing a triangular wave corresponding to the integral of said square wave; and means coupled to the integrating circuit for providing an output signal of one predetermined value when the value of the triangular wave exceeds a first predetermined value, and for providing an output signal of another value when the triangular wave has a value less than a second predetermined value lower than the first predetermined value.

7. Apparatus in accordance with claim 6, in which a holding circuit is coupled to said square wave generating means for establishing the instantaneous value of the square wave at one predetermined value during a first condition of operation and at another predetermined value during another condition of operation.

8. A reading amplifier for use in conjunction with a magnetic recording system for distinguishing between information bearing signals and extraneous signals, including in combination an input terminal; a first integrating circuit coupled to the input terminal; a trigger circuit coupled to the first integrating circuit having two conditions of operation; means coupling the output of the trigger circuit to the first integrating circuit for establishing a voltage across the first integrating circuit of a first predetermined value during one of said conditions of operation and for establishing a voltage across the integrating circuit of a second predetermined value during the other of said conditions of operation; a second integrating circuit coupled to the output of said trigger circuit; and means coupled to the second integrating circuit for providing output signals corresponding to the information bearing signals applied to the input terminal only.

References Cited in the file of this patent

UNITED STATES PATENTS

| | | |
|---|---|---|
| 2,470,677 | Anderson | May 17, 1949 |
| 2,606,975 | Goldfischer | Aug. 12, 1952 |
| 2,632,053 | Volz | Mar. 17, 1953 |
| 2,695,992 | Winger | Nov. 30, 1954 |
| 2,698,427 | Steele | Dec. 28, 1954 |